May 18, 1954 N. T. VOLSK 2,678,685

FLAT SPRING AND STRUCTURE

Filed Feb. 27, 1948 4 Sheets-Sheet 1

INVENTOR.
Nicholas T. Volsk

May 18, 1954     N. T. VOLSK     2,678,685
FLAT SPRING AND STRUCTURE

Filed Feb. 27, 1948     4 Sheets-Sheet 3

*INVENTOR.*
Nicholas T. Volsk.

May 18, 1954 N. T. VOLSK 2,678,685
FLAT SPRING AND STRUCTURE
Filed Feb. 27, 1948 4 Sheets-Sheet 4

INVENTOR.
Nicholas T Volsk.

Patented May 18, 1954

2,678,685

UNITED STATES PATENT OFFICE 2,678,685

FLAT SPRING AND STRUCTURE

Nicholas T. Volsk, Spring Lake, N. J.

Application February 27, 1948, Serial No. 11,468

17 Claims. (Cl. 155—179)

This invention relates to flat springs, methods of making them, and seat structures built of such springs.

The most widely used springs for making seats are spiral or helical springs which possess high efficiency expressed in allowable energy absorption per pound of metal. The spiral springs also enable one to obtain highly elastic or soft seat cushions and back rests, which possess long natural period of vibration. It is only when spring structures possess long natural period that it is possible to produce soft, "floating ride" seats. This excellence of performance and high efficiency are generally obtained at high cost, and by constructing seats which have large cubic displacements. Therefore, if the amount of allowable space for seats is very limited, the use of spiral springs is precluded, and it becomes necessary to resort to the use of some other springs, such as "flat" or "leaf" springs, the words flat or leaf signifying that the vertical dimension of the transverse vertical cross-section of such spring is limited, as a rule, only to the thickness of the metal used for making the spring; actually springs of this type are hardly ever flat but represent arcuate, elastic beams supported at two extreme ends. While flat springs enable one to construct seats with smaller cubic displacements and at a lower cost, these gains are currently obtained at the expense of the desired long period and efficiency, i. e., allowable energy absorption per pound of metal, and the concomitant loss in the elasticity or "softness" of the entire spring structure. The loss in efficiency is due to the non-uniform type of stress distribution present in flat springs, which necessitates increase in the cross-sectional area of these springs, i. e., increase in their dimensions, and, therefore, weight, until they can support the maximum expected load in spite of this unfavorable stress distribution. This increase in weight lowers the elasticity of the structure and shortens its natural period.

From the above it follows that the performance of flat springs can be enhanced only if they are given a configuration permitting higher allowable energy absorption per pound of metal, which can be obtained only if there is a more uniform type of stress distribution throughout the structure.

The invention discloses a flat spring structure possessing higher allowable energy absorption per pound of metal and longer natural period than the known flat springs.

It is therefore an object of this invention to provide flat springs possessing higher allowable energy absorption per pound of metal and longer natural period than the known flat springs.

It is an additional object of this invention to provide flat springs comprising a plurality of interconnected elliptic cells forming an elastic arch, the springs being composed either of independent arches or laterally interconnected arches.

It is also an object of this invention to provide a flat spring composed of two srtaight-edge strips with a plurality of spaced, arcuate columns of elliptic cells between the strips, the cells in each column being connected to each other and forming an elastic, pre-shaped longitudinal arc connected to the edge strip at each end of the arc.

It is an additional object of this invention to provide a spring composed of a plurality of longitudinally and laterally integrated elliptic cells, the longitudinal integration connecting a plurality of elliptic cells along their shorter axes to form a longitudinal, arcuate column composed of these cells, and the lateral integration interconnecting the cell columns, all of the columns being connected at each end to an edge strip, and the spring given a permanent arcuate set with the result that the spring, in its entirety, represents an approximately cycloidal, or arcuate, elastic sheet with high shearing rigidities and relatively low compressive and flexural rigidities.

Still another object of this invention is to provide seat cushions and back rests utilizing the disclosed types of flat springs.

These and other features of the invention will be more clearly understood from the following detailed description and the accompanying drawings in which.

Figure 1:
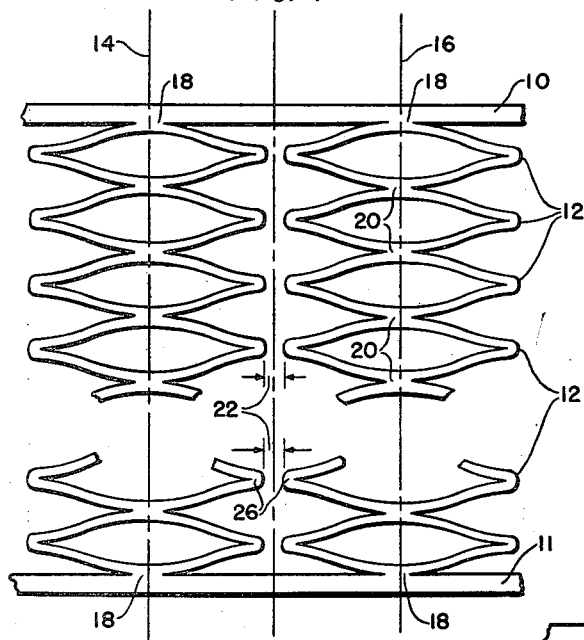
Figures 1 through 4 are plan views of small portions of integrated elliptic cells forming a spring.
Figure 6:
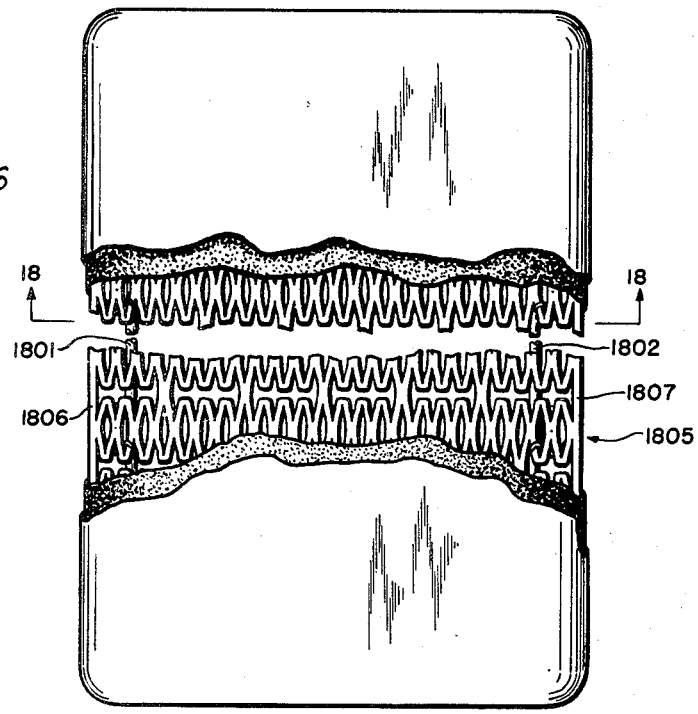
Figures 6 and 7 are plan and vertical sectional views respectively of a seat cushion constructed of a spring disclosed in Fig. 2.
Figure 7:
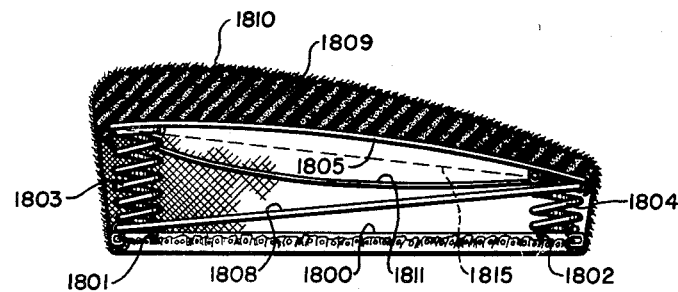

Referring to Fig. 1, the spring illustrated in this figure comprises two flat, metallic edge strips 10 and 11 and a plurality of rows of longitudinally integrated or interconnected elliptic cells 12. The term "elliptic cell," as used in this specification refers to a substantially elliptically-shaped spring as clearly illustrated in Fig. 5. This spring consists of two opposing, bow-shaped leaves 509 and 510, which will be referred to in this specification as "strands," the term used in the expanded metal art, to indicate only approximately similar elements, these strands being connected to each other at their ends to form two rigid, solid metal cell-end junctions 514, 516 between the two strands. These junctions 514, 516, are equivalent to, and replace, the usual shackle-and-hanger connections of a conventional elliptic spring. The elliptic cell is connected through solid-metal, central, interstrand connections 518 and 520 to identical strands 522 and 524, respectively, of adjacent elliptic cells, and this pattern of interconnected unitary elliptic cells repeats itself, as illustrated in Fig. 1, until the interconnected cells form a single column of cells, which column terminates at each end in an edge strip, such as strips 10 and 11. Only two juxtaposed columns of the elliptic cells, symmetrical with respect to the respective longitudinal axes 14 and 16 of the two columns, are illustrated in Fig. 1. However, in actual practice the number of columns of such elliptic cells is determined by the width of the seat structure, and it will call for a larger number of columns than two. Each column of the elliptic cells 12 is connected at one end to strip 10 by means of portions 18 of the cells adjacent to the strip. If the longer axis 500 (Fig. 5) of a cell is called the major axis, and the shorter axis 502 is called the minor axis, then it may be stated that the cells are interconnected with each other by means of their central inter-strand connections 518, 520, etc. along their minor axes, thus forming the longitudinal axis 14 or 16 (Fig. 1) and the cells at the ends of each column are connected to the edge strips 10, 11 by means of the strand-edge strip connections 18 where the minor axes of these end cells intersect the edge strips. Therefore, the entire spring represents a plurality of columns of elliptic cells, the cells in each column being metallically connected at their mid-portions, through the interstrand connections 20, to each other along their minor axes to form longitudinal column axes 14 and 16, these columns being in turn connected through the strand-edge strip connections 18 to two flat, metallic strips at the point of intersection of the longitudinal axes with the edge strips. The lateral length L of the elliptic cells (Fig. 5), or the length along the major axes 500, is such as to provide gaps 22 (Fig. 1) between the right and left ends of the cells of one column and the corresponding adjacent ends of the cells in adjacent columns. The existence of these gaps, or spacings, between adjacent columns enables the individual cells to elongate laterally, along their major axes, in two opposite directions, as illustrated by arrows 504 and 506 in Fig. 5, with strands 508 and 510 approaching each other, and the spread 512 of the cell becoming smaller when they are loaded, like in an ordinary elliptic spring under compression, and resume their natural illustrated shape when the load is removed from the spring. The spacing, or gap, 22 between the rows becomes proportionately smaller, and the outer ends 26 may even tend to touch each other when the cells become completely closed due to extreme compression so that the two semi-elliptic halves, or strands, 509 and 510 of the cell meet each other, and close the approximately elliptic space normally confined by them when they are not under load. Such action of the elliptic cells is made possible due to the fact that the entire "flat" spring, prior to its use, is subjected to a rolling operation, which transforms the spring into a hollow cylinder having a "set" due to a heat-treating process or the above rolling operation, and this cylinder is subsequently unrolled against the resistance of the "set" and fastened to a seat frame. The final shape of the spring is then in a form of an arc or a convex surface, as illustrated in Figs. 6 and 7, and when this arc is subjected to loading, it will shorten under load because of the elastic properties of the arc. This shortening of the arc is made possible by constructing the arc itself of a plurality of elliptic cells which can be compressed or expanded, depending upon the load and the resulting arc conditions. Under extreme loading the arc may be depressed even below its no-load geometric chord 1815, Fig. 7, and when this is the case, the compression of the unit cell is replaced with stretching. In either case there is a complete recovery of the spring to its initial position upon the removal of the load because the spring is heat-treated after the rolling operation, so that the spring is thus given a predetermined "set" or "cold worked" for accomplishing the same result.

As will become more apparent in connection with the description of Figs. 6 and 7, the end strips 10, 11, are affixed to a rigid frame of a seat, and the cell columns form an arcuate or cylindroidal surface which is used for supporting a load. The dimensions of the elliptic cell will be described in connection with Fig. 5.

From the description of the spring given thus far, it follows that a plurality of columns of elliptic cells become either contracted or expanded (depending upon the state of the arc) when they are subjected to load, such contraction being made possible by the existence of the gaps 22 between the columns, the "set" imparted to the spring, and the arcuate shape of the spring. When a load is imposed on the arc formed by a column of elliptic cells, the length of the column contracts with the concomitant contraction of the elliptic cells, each cell acting, in part, in compression, each column responding individually to the imposed load. When the column is deformed by a heavy load to such an extent that its length is made longer than normal, then the cells will begin to expand and act, in part in tension. It should be noted here, however, that the actual stresses in a structure of this type are much more complex than simple compression and tension. Upon the removal of the load, the entire spring returns, because of the imparted "set," to its normal, partially spread condition illustrated in Figs. 6 and 7.

Figure 2:
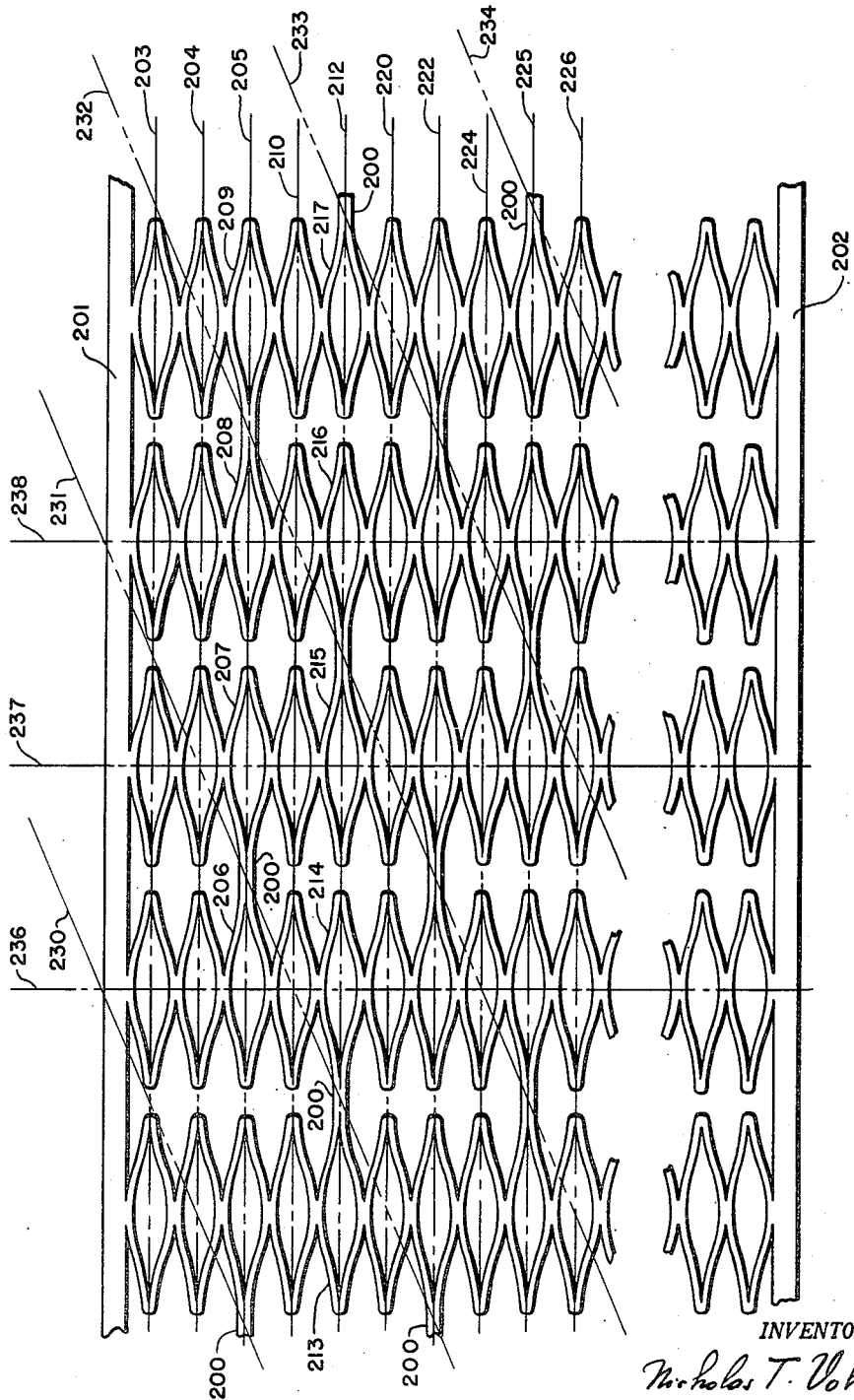

Fig. 2 illustrates a modified version of Fig. 1, in which inter-column connections 200 are used between the ends of every fourth pair (in longitudinal direction) of adjacent cells. To prevent undesirable stiffening of the cells next to the edge strips 201 and 202, the cell rows next to the strips do not have any lateral, inter-row connections. Thus, in Fig. 2, two lateral rows of cells, rows 204 and 203 are free of any lateral connections. In the next lateral row 205, cell 206 is connected to cell 207, and cell 208 to cell 209. There are no lateral connections in the next row 210. In the succeeding row 212, cell 213 is connected to cell 214, and 215 to 216; also cell 217 is connected to an adjacent cell in the next column, etc. From then on the lateral, inter-column connections pattern repeats itself, with no connections in row 220, with the lateral connections in row 222 being identical to those in row 205, no connections in rows 224 and 226, and row 225 matching row 212. Examination of these connections reveals the fact that they follow diagonal axes 230 through 234 with a free cell interposed between succeeding connections, and the connections next to the edge strips 201 and 202 being omitted. Thus, the cell columns are integrated laterally along the lateral axes 205, 212, 222, etc., and the cells of each column are interconnected, as in Fig. 1, through interstrand connections along their minor axes to form a plurality of longitudinal columns with the longitudinal column axes 236, 237, etc. The entire assembly represents a single elastic unit which enables one to obtain a more uniform load distribution over the entire spring surface because of the lateral support furnished to any longitudinal column of cells, such as 237, by adjacent column of cells which are to the left (236) and to the right (238) of it. This type of construction gives higher spring efficiency expressed in terms of allowable energy absorption per pound of metal with the concomitant possibility of increasing the natural period of the spring structure. The staggered distribution of the lateral, intercolumn connections enables one to obtain this higher efficiency without perceptibly arresting the elasticity of the individual columns of cells. While Fig. 2 illustrates one type of suitable lateral connections, it is to be understood that other modes of inter-column integration may be used.

It should be borne in mind, however, that it is disadvantageous to interconnect large numbers of cells in adjacent columns because such increase in the degree of lateral integration precludes lateral extension of the elliptic cells under load. To illustrate, in an extreme case, when all the cells in one column are connected to the adjacent cells in adjacent columns, such over-integration will produce complete paralysis of the entire spring, and would transform the spring into a sheet of well-known "flat" expanded metal, devoid of any springing action, which is useless for the intended purpose.

Figure 3:
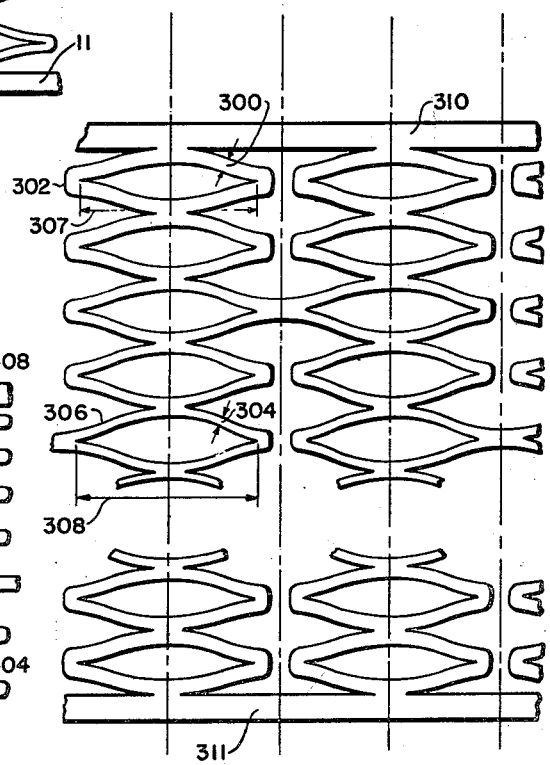

Fig. 3 discloses a modification of Fig. 2; in Fig. 3 there is a progressive decrease in the strand width of the cells, and a corresponding small increase in the length of the slits, toward the center of the spring. Therefore, the strand width 300 of a cell 302 is larger than a width 304 of a cell 306, and slit 307 is slightly shorter than a slit 308. Stated differently, the strand width decreases progressively from edge strip 310 toward the center of the spring, and then increases again progressively from the center of the spring toward edge strip 311 at the opposite end of the spring. Such strand dimensioning may be used for increasing all rigidities in proportion to anticipated increased stresses nearer the edge strips 310 and 311, the anticipated stresses being maximum at the cells adjacent to the edge strips. Therefore, by increasing the strand width 300 of cell 302, adjacent to strip 310, and thereby slightly decreasing the length of slit 307, it becomes possible to provide an additional amount of metal to take care of anticipated stress concentrations at the ends of the longitudinal columns.

Figure 3A:
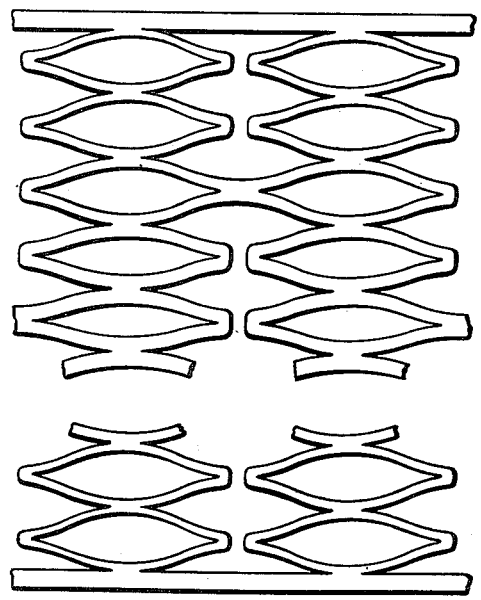

Fig. 3A discloses an additional modification of Fig. 2. Fig. 3A may be considered also as a modification of Fig. 3 in that the strand width decreases progressively from the center of the spring toward the edge strips, and the length of the slits is minimum in the center and maximum next to the edge strips. Thus Fig. 3A represents the reversal of what is disclosed in Fig. 3. This configuration can be used for controlling the shape of the curvature of the spring upon its final stretching across a frame.

Figure 4:
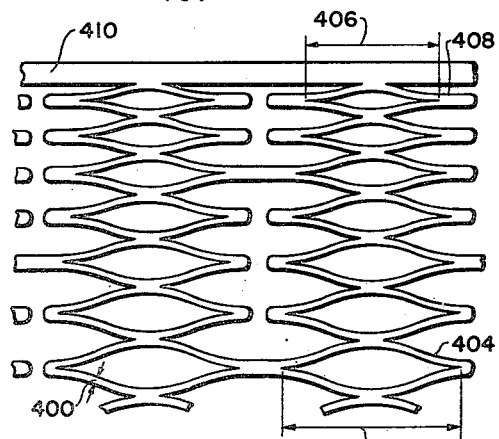
Figure 4:
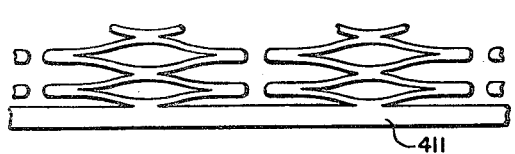

Fig. 4 illustrates a modification of Fig. 3; in Fig. 4, the strand width 400 is the same for all cells, but there is an increase in the length of the slits, the slit length 402 of a cell 404, some distance from the edge strip 410, being longer than the slit length 406 of a cell 408, adjacent said strip 410. In this modification the lengths of the slits are least in the cells adjacent to the edge strips 410 and 411, and is greatest at the center of the spring. The reasons for this modification are the same as those described in connection with Fig. 3.

Figure 5:
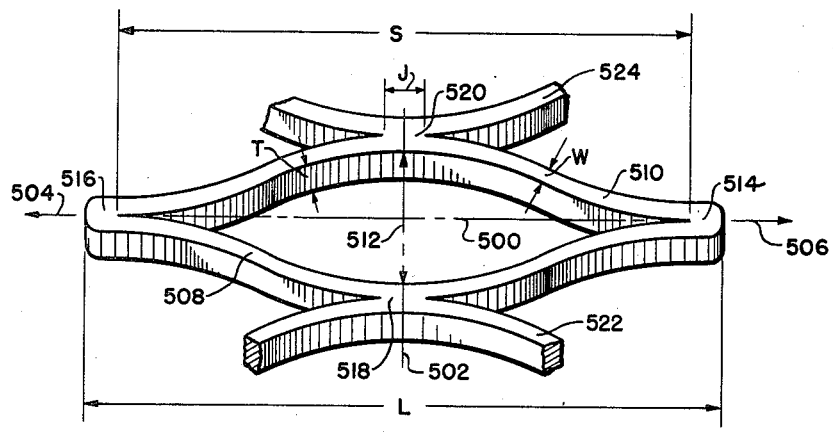
Figure 5 is a perspective view of a single elliptic cell.

From the description of Figs. 1 through 4, it follows that the elasticity and load-carrying capacity of an individual cell may be varied by varying its lateral overall length L, Fig. 5, the length S of the slit and the cross-sectional area of the two semi-elliptic springs or strands 508 and 510, constituting the unit cell. This cross-sectional area is determined by the strand width W and the strand thickness T. It should be also mentioned that normally the length S of the slit determines the length J of the interstrand connections which join the cells if the lengths of all the slits, S, are made equal to each other. However, the interstrand connection can be controlled independently by decreasing the lengths of those slits which separate the strands from each other, i. e., strand 510 from strand 524, and strand 508 from strand 522. It is apparent from an examination of Fig. 5 that, with all other dimensions remaining constant, the larger the dimension L is the more elastic the spring is, and the longer its natural period is. The same is true of the length S of the slit. Similarly, when the dimensions W and T are made smaller the spring will respond more readily to the loads imposed upon it. The same is true when, with thickness T remaining constant, width W is decreased to the dimensions capable of resisting twisting of thickness T into the plane of the drawing, i. e., by 90 degrees. The maximum T to W ratio may be of the order in excess of 2 to 1. The ultimate performance of the spring is determined by balancing and selecting all of the above mentioned dimensions to obtain the optimum performance of the entire structure at a given load. Since any of these dimensions can be varied at will in the disclosed structure, a designer is given great freedom to select the optimum dimensions, which produce a spring structure having higher efficiency, lighter weight and longer period than those obtainable with the known flat springs. Moreover, introducing a moderate degree of lateral integration between the cell columns by means of the integrating connections produces a single elastic structure having longitudinal and lateral elasticities, the lateral connections increasing the period of the spring still further because of the possibility of spreading the load over the entire structure.

The figures described thus far, therefore, disclose a single piece metal spring composed of a column of interconnected elliptic cells 12, Fig. 1, symmetrically disposed along a longitudinal axis, such as 14 or 16 of the column. Each elliptic cell is composed of two semi-elliptic strands, such as strands 508 and 510 in Fig. 5, and bonds 514, 516, 518 and 520. The columns of the elliptic cells can be individual columns (by eliminating the edge strips 10—11) or a plurality of laterally spaced columns, the spacing between the columns being illustrated at 22 in Fig. 1, with the opposite ends of the columns being connected to the edge strips 10 and 11, Fig. 1. In the latter case the edge strips and the columns comprise a unitary structure, functioning as a single unit. Fig. 2 also discloses lateral connections between adjacent columns, these connections being uncut bonds 200. In all cases the spring is imparted an arcuate shape and a permanent set through the heat treating process or cold working.

Figs. 6 and 7 disclose one specific application of the spring to a seat structure, in this particular case to a seat cushion. A G-shaped channel is bent into a rectangular base frame 1800. This frame, and rods 1801 and 1802 spot welded to frame 1800 act as a support for two rows of any elastic elements which are illustrated here as coil springs 1803 and 1804. These coil springs are attached to the base frame and the rods in well-known manner.

An elliptic cell spring 1805 with the edge strips 1806 and 1807 is mounted on top of the coil springs, whereupon the coil springs are hooked to the edge strips by means of wire clips or spot welded to them. The structure is stabilized, if so desired, by one or two stabilizing rods such as 1808, one end of which is connected to frame 1800 and the other end to the edge strip 1807. Since the elliptic spring columns, which represent the supporting surface of the seat cushion, were previously arched by means of the shaping belts, into the arcuate shapes, the chord subtending this shape is many times shorter than the chord 1815 illustrated in Fig. 7. This being the case the spring, because of the permanent set imparted to it during the heat-treating process, will be continuously under stress, this stress tending to restore the spring back to its original arcuate shape, i. e., the spring will try to curl up again. This curling up is resisted by two side rods, only one of which rod 1811 is visible in the figure. Rod 1811 is connected to, or spot welded to the outer ends of the edge strips 1806 and 1807, respectively. Thus the edge strips and the rods form a rectangular frame which, together with the coil springs, support the entire elliptic cell spring. This frame can be stiffered considerably by imparting an L-shape to the edge strips prior to passing the spring sections through the shaping belts, but after the shearing off operation. A padding 1809 and an upholstering material 1810 complete the seat cushion.

While there have been described what at present are considered preferred embodiments of the invention, it will be obvious to those skilled in the art that various changes and modifications may be made therein without departing from the invention, and it is therefore aimed in the appended claims to cover all such changes and modifications as fall within the true spirit and scope of the invention.

I claim:

1. A spring including a plurality of laterally spaced columns of interconnected elliptic cells, two edge strips, a connection between one end of each column and one edge strip, and a connection between the opposite end of each column and the other edge strip, said cells, edge strips and connections comprising a unitary metallic structure.

2. An article of manufacture as defined in claim 1 in which none of the cells in adjacent columns are connected to each other.

3. An article of manufacture as defined in claim 1 in which a limited number of the cells in adjacent columns are interconnected.

4. An article of manufacture as defined in claim 1 in which the widths of the cells as measured along their minor axes increase near the middles of the columns, a limited number of the cells in adjacent columns having means to interconnect their adjacent ends.

5. A seat cushion comprising a base frame, a plurality of elastic elements supported by said frame, a spring including front and rear edge strips and a plurality of laterally spaced columns of interconnected elliptic cells between said edge strips, first and second side rods connected between said front and rear strips; said first rod being connected between the left ends of said front and rear edge strips, and said second rod being connected between the right ends of said front and rear edge strips, and connections between said spring and said elastic elements, said elastic elements supporting said spring.

6. A metallic spring comprising a plurality of columns including elliptic cells symmetrically disposed along the longitudinal axis of the column, each cell having two strands shaped into two, complementary, semi-elliptic springs with a first set of metallic bonds between the outer matching ends of said strands, and a second set of metallic bonds, between mid-portions of adjacent strands, said second set of bonds being disposed along said longitudinal axis, each said column comprising an arcuate, metallically unitary spring, and said strands having arcuate surfaces on the convex side of said arcuate spring; said columns being laterally equally spaced from each other and having substantially equal lengths, a first metallic edge strip interconnecting one end of all of said columns, said edge strip being connected to the mid-portion of the last, outer strand at said one end of each of said columns, and an identical type of edge strip at the opposite ends of said columns, the longitudinal axes of said strips being substantially perpendicular to the longitudinal axes of said columns, said columns and said edge strips comprising a unitary metallic structure.

7. A spring comprising a plurality of semi-elliptic strands of equal length, the two ends of one strand being metallically bonded to the two ends of adjacent strand, whereby each two complementary strands form an elliptic cell having two strands and two bonded but otherwise free cell-ends, all of the elliptic cells being symmetrically positioned along a longitudinal axis of said spring to form a column of elliptic cells terminating at said cell-ends, and metallic bonds between the mid-portions of adjacent strands for integrating said cells into a single metallic spring composed of elliptic spring-cells having free cell-ends whereby each cell is free to expand and contract in the directions transverse with respect to said longitudinal axis.

8. An article of manufacture comprising elliptic cells of spring material placed together so they have a common minor axis and each cell being connected to adjacent cells along said common minor axis to form a column, at least some of the cells being free at both ends of their major axes whereby they are free to deflect along those axes.

9. An article of manufacture as defined in claim 8 in which the column is arcuate.

10. An article of manufacture as defined in claim 9 in which all the cells are free at both ends of their major axes.

11. An article of manufacture as defined in claim 8 including at least two of said columns arranged parallel to each other and the majority of complementary cells in adjacent columns being spaced from each other.

12. An article of manufacture as defined in claim 11 in which said columns are interconnected at complementary ends thereof and in which the whole article is arcuate.

13. An article of manufacture as defined in claim 8 in which the widths of the cells as measured along their minor axis increase near the middle of the column.

14. An article of manufacture as defined in claim 8 in which the widths of the strands of the cells decrease near the middle of the column.

15. An article of manufacture comprising elliptic cells of spring material connected to each other along their minor axes to form a column, substantially every cell being free at at least one end of its major axis, whereby substantially all of the cells are free to deflect along their major axes.

16. An article of manufacture as defined in claim 15 in which the elliptic cells are composed of strands having a thickness T and a width W, the order of the dimensional limits of T in terms of W being $T=W$ as a minimum and $T=3W$ as a maximum.

17. An articles of manufacture comprising parallel columns, each column including the following: elliptic cells of spring material connected to each other along their minor axes to form a column, a majority of the cells being free at at least one end of its major axis whereby those cells are free to deflect along their respective major axes.

References Cited in the file of this patent
UNITED STATES PATENTS

| Number | Name | Date |
|---|---|---|
| 176,486 | Schnable | Apr. 25, 1876 |
| 564,531 | O'Brien | July 21, 1896 |
| 612,620 | Van Devanter | Oct. 18, 1898 |
| 1,451,936 | Young | Apr. 17, 1923 |
| 1,845,980 | Kessler | Feb. 16, 1932 |
| 1,850,543 | Gersman | Mar. 22, 1932 |
| 1,862,221 | Kaminetsky | June 7, 1932 |
| 1,881,997 | Browne | Oct. 11, 1932 |
| 2,104,249 | Vass | Jan. 4, 1938 |
| 2,242,540 | Nordmark | May 20, 1941 |
| 2,257,367 | Bernstein | Sept. 30, 1941 |
| 2,280,840 | Neely | Apr. 28, 1942 |
| 2,302,479 | Tallmadge | Nov. 17, 1942 |
| 2,306,150 | Asaro | Dec. 22, 1942 |
| 2,400,426 | Liptay et al. | May 14, 1946 |